United States Patent

[11] 3,611,163

[72] Inventor Marshall Watnick
Trumbull, Conn.
[21] Appl. No. 864,096
[22] Filed Oct. 6, 1969
[45] Patented Oct. 5, 1971
[73] Assignee United Aircraft Corporation
East Hartford, Conn.

[54] CARRIER PEAK AMPLITUDE INSENSITIVE SYNCHRO DETECTOR
5 Claims, 4 Drawing Figs.

[52] U.S. Cl. .......... 328/151, 307/238, 307/246
[51] Int. Cl. .......... H03k 5/00
[50] Field of Search .......... 328/151, 160; 307/232, 246

[56] References Cited

UNITED STATES PATENTS

| | | | |
|---|---|---|---|
| 3,169,233 | 2/1965 | Schwartz | 328/151 X |
| 3,430,227 | 2/1969 | Hillis | 328/151 X |
| 3,493,874 | 2/1970 | Finkel et al. | 328/151 |

*Primary Examiner*—Alfred L. Brody
*Attorney*—Shenier and O'Connor

ABSTRACT: A carrier-insensitive synchro detector in which the modulating envelope of a modulated carrier signal is detected by sampling the modulated carrier signal at instants at which the reference carrier amplitude is equal to a reference potential which is less than the peak amplitude of the reference carrier thus to eliminate the effect of possible carrier amplitude variations on the detected output.

INVENTOR.
Marshall Watnick
BY
Shenier & O'Connor
ATTORNEYS

CARRIER PEAK AMPLITUDE INSENSITIVE SYNCHRO DETECTOR

BACKGROUND OF THE INVENTION

Various electronic systems employ devices such as synchros in which information is transmitted in the form of an amplitude-modulated carrier signal. In order to extract the information from a signal of this sort the envelope of the modulated signal is detected. While such a system operates accurately in theory in many instances the amplitude of the reference carrier varies greatly. In demodulators or detectors of the prior art his carrier amplitude variation is interpreted as a modulation so that the resultant detected signal incorporates an error. In order to eliminate errors of this sort in the prior art either the carrier peak amplitude must be held constant or a system employing ratio detection must be used. Both of these expedients require complicated and consequently expensive circuitry.

I have invented a carrier-insensitive synchro detector which eliminates errors which otherwise would result from carrier amplitude variation. My detector overcomes the defects of detectors or demodulators of the type known in the prior art. It is extremely simple and is inexpensive for the result achieved thereby.

SUMMARY OF THE INVENTION

One object of my invention is to provide a carrier-insensitive synchro detector which eliminates output errors which otherwise would result from carrier peak amplitude variations.

Another object of my invention is to provide a carrier-insensitive synchro detector which overcomes the disadvantages of detectors of the prior art.

A further object of my invention is to provide a carrier-insensitive synchro detector which is simple and inexpensive for the results achieved thereby.

In general my invention contemplates the provision of a carrier-insensitive synchro detector in which I sample a modulated carrier signal at instants at which the carrier reference is equal to a reference potential which is less than the peak amplitude of the carrier reference. The sample values provide the detected output representing the modulated signal without incorporating any errors which otherwise would result from carrier peak amplitude variations.

BRIEF DESCRIPTION OF THE DRAWINGS

In the accompanying drawings which form part of the instant specification and which are to be read in conjunction therewith and in which like reference numerals are used to indicate like parts in the various views.

DESCRIPTION OF THE PREFERRED EMBODIMENT

Figure 1:
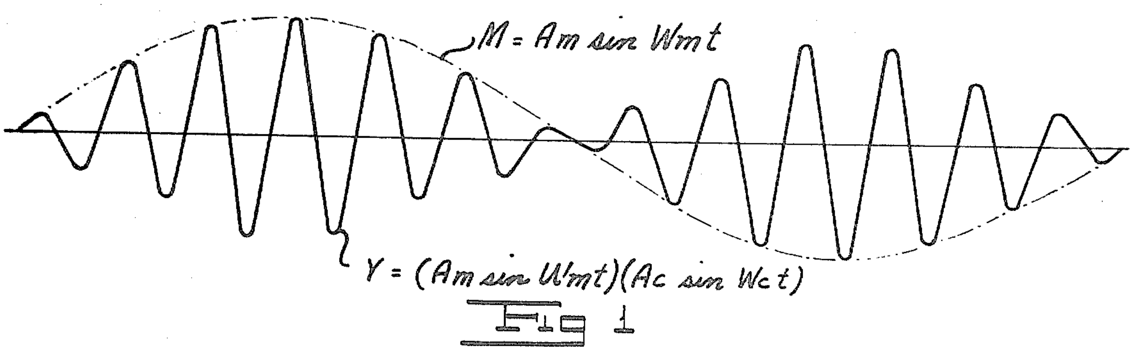
FIG. 1 is a diagram illustrating an amplitude-modulated carrier signal the envelope of which is to be detected.
Figure 2:
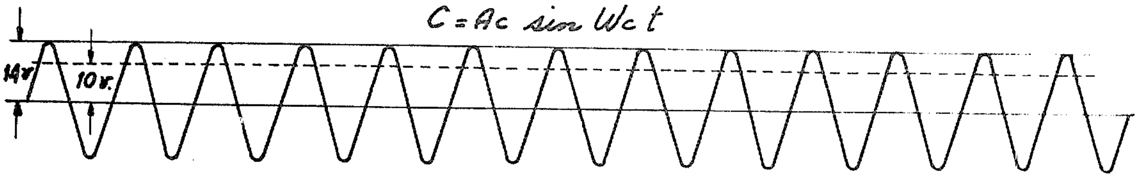
FIG. 2 is a diagram illustrating the reference carrier of the signal shown in FIG. 1.

Referring now to the drawings in FIG. 1 I have illustrated an amplitude-modulated carrier signal which may be represented by the equation:

(1) $Y=(A_m \sin w_m t)\ (A_c \sin w_c t)$ in which $M=A_m \sin w_m t$ is the modulating signal representing the information to be extracted. In one particular system in which my detector is useful a carrier signal from a source 10 is applied to the rotor 12 of a synchro transmitter indicated generally by the reference character 14 having a stator 16. As is known in the art, in response to displacement of the shaft 18 of rotor 12 the stator 16 puts out signals on channels 20, 22 and 24 which are applied to the stator 26 of a synchro receiver indicated generally by the reference character 28. As a result the rotor 30 of synchro 28 provides an output signal on a conductor 32 which is an amplitude-modulated carrier signal such as shown in FIG. 1 in which the envelope of the signal represents the relative displacement between shaft 18 of transmitter 14 and the shaft 34 of the receiver 28.

As has been pointed out hereinabove, if the peak amplitude of the carrier signal from source 10 varies, that variation will introduce a corresponding variation in the output signal on conductor 32. Detectors of the prior art interpret such a variation as a modulation and consequently provide outputs which incorporate an error resulting from variations in the peak amplitude of the carrier signal. In my system I overcome the problem just outlined by sampling the modulated carrier signal at instants at which its value is equal to a reference potential which is less than the peak value of the carrier signal.

My arrangement includes a push-pull balanced differential amplifier made up of a first transistor 36 having a collector resistor 38 leading to a terminal 40 carrying a positive potential. The amplifier has a second transistor 42 provided with a collector resistor 44 leading to terminal 40. I provide the transistors 36 and 42 with a common emitter resistor 46. A voltage divider including a resistor 48 and a Zener diode 50 connected between terminal 40 and a ground conductor 52 provide a biasing potential for transistor 42. Another voltage divider comprising resistors 54 and 56 connected between the source 10 and ground conductor 52 applies a portion of the carrier wave to the base of transistor 36.

By way of example, I have indicated typical values for the carrier wave and for the circuit parameters of the amplifiers including transistors 36 and 42. The carrier wave may have a frequency of 400 Hertz and a peak value of 14 volts. Arbitrarily, I sample the modulated signal on conductor 32 at instants at which the carrier wave is at about 70 percent of its peak value or at about 10 volts. By way of example, the collector resistors 38 and 44 and the common emitter resistor 46 each may have a value of about 1K. Resistor 48 may have a value of 10K while the diode 50 holds the potential of the base of transistor 42 at 5 volts. I select resistors 54 and 56 to have values of 10K each so that half the instantaneous voltage of the carrier wave is applied to the base of transistor 36.

Under the conditions just described and assuming that the carrier wave is rising from 0 volts but that it has not yet reached 10 volts, transistor 42 conducts so that a potential of about 5 volts exists at the emitter of transistor 36 and that transistor is cut off. As the carrier wave increases towards its peak value the potential at the common terminal of resistors 54 and 56 rises until when the carrier voltage is just rising to above 10 volts the common terminal potential rises to just above 5 volts and transistor 36 begins conducting. With transistor 36 conducting and with the potential at terminal 40 of about 12 volts, the emitter of transistor 42 rises to a potential of about 6 volts and transistor 42 cuts off.

I provide my detector with means for producing a triggering pulse or voltage spike each time conduction switches between transistors 36 and 42. I connect respective capacitors 58 and 60 between the collectors of transistors 36 and 42 and respective resistors 62 and 64 leading to ground line 52. Respective diodes 66 and 68 connect capacitors 58 and 60 to a resistor 70 leading to ground line 52. I select each of the resistors 62 and 64 to have a value of about 75K and the resistor 70 to have a value of about 10K. Capacitors 58 and 60 each has a value of about 500 picofarads. With these circuit parameters the time constant of the RC circuits made up of the respective capacitors 58 and 60 and resistor 70 is about 5 microseconds.

Figure 3:
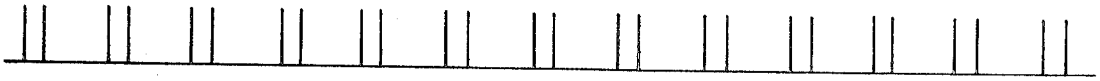
FIG. 3 is a diagram illustrating sampling pulses produced in my carrier-insensitive synchro detector.
Figure 4:
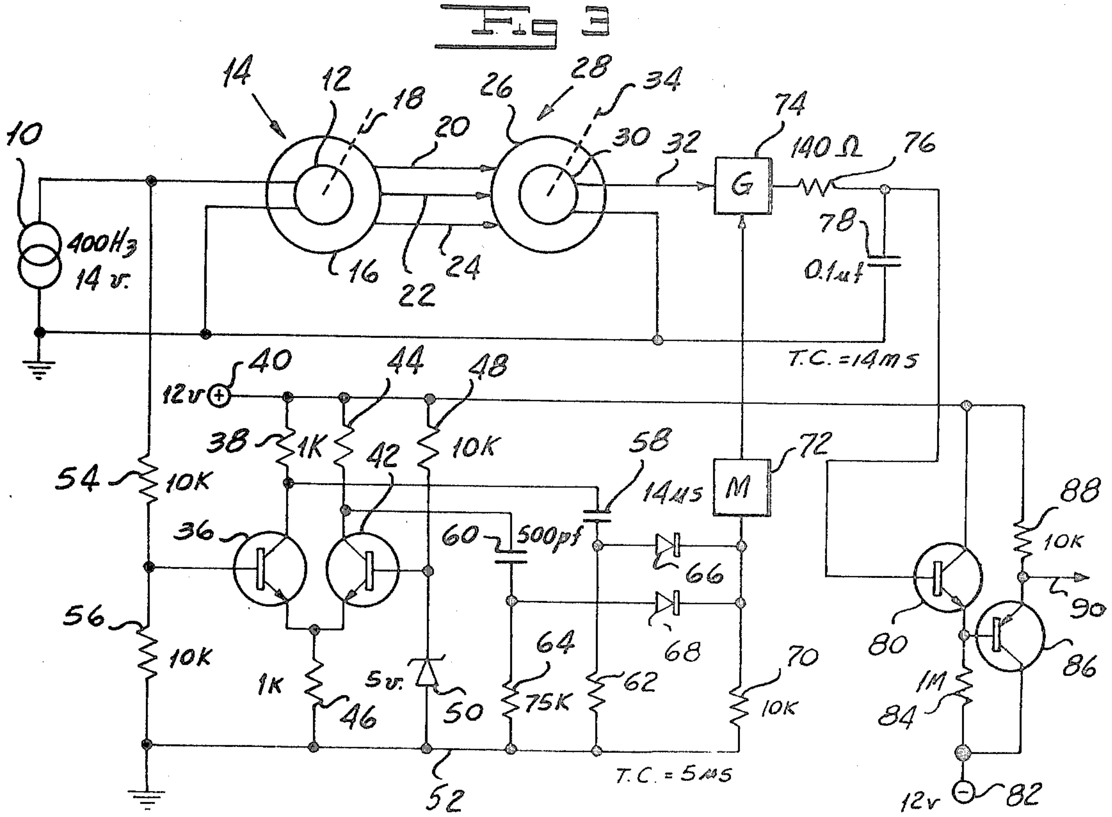
FIG. 4 is a schematic view of one embodiment of my carrier-insensitive synchro detector.

Under the conditions just outlined when conduction shifts from transistor 36 to transistor 42 a spike of voltage immediately appears across resistor 70. Conversely, when conduction shifts from transistor 42 to transistor 36 another spike of voltage appears across resistor 70. Such pulses are shown in FIG. 3. I apply these sampling pulses to the input terminal of a one-shot multivibrator 72 producing a pulse of about 14 microseconds in length. The output of multivibrator 72 triggers a normally nonconductive gate 74 to apply the signal on conductor 32 to an integrating circuit made up of a resistor 76 and a capacitor 78 for the period of time during which the multivibrator conducts. Conveniently, I select resistor 76 to have a value of 140 ohms and the capacitor 78 to have a value of 0.1 microfarads so that the integrator has a time constant of about 14 microseconds, equal to the pulse length of multivibrator 72.

From the structure just described it will be seen that gate 74 is turned on for 14 microseconds at the time when the reference carrier wave reaches a value of 10 volts and is again turned on for a period of 14 microseconds when the carrier wave again drops to a value of 10 volts. I apply the integrated signal at the common terminal of resistor 76 and capacitor 78 to the base of an emitter follower transistor 80 the collector of which is connected to terminal 40 and the emitter of which is connected to a terminal 82 carrying a potential of about minus 12 volts by a resistor 84. I apply the signal on emitter resistor 84 to the base of another emitter follower stage including a transistor 86 the collector of which is connected to terminal 82 and the emitter of which is connected to terminal 40 by resistor 88. Thus, a signal representing the integrated samples appears on an output channel 90 connected to the emitter of transistor 86. It is to be noted that while there will normally be no phase shift between the carrier input and the modulated carrier output, there may be a phase reversal between the two. Thus it may be that the modulated carrier is being sampled during its negative half-cycles. I enable my detector to provide an output in response to such a sampling by connecting two output emitter followers between positive terminal 40 and negative terminal 82. The two emitter follower stages prevent discharge of the storage capacitor 78 and eliminate the direct-current offset or drift resulting from base-to-emitter drops in the transistors owing to the fact that the base-to-emitter drops of transistors 80 and 86 offset each other.

In operation of my carrier-insensitive synchro detector the carrier signal from source 10 feeds the rotor 12 of transmitter 14 to cause the output channel 32 of the receiver 28 to carry a signal which is an amplitude-modulated carrier wave the modulation of which represents the relative angular displacement between shafts 18 and 34. Assuming that the reference carrier potential is between 0 and 10 volts on the rising portion of the wave transistor 42 will be conducting and transistor 36 is cut off. As the carrier wave rises above 10 volts transistor 36 is turned on and transistor 42 is cut off. When that occurs a spike of voltage appears across resistor 70 to trigger multivibrator 72 to turn the gate 74 on for a period of 14 microseconds to apply a sample to the integrator including resistor 76 and capacitor 78. After the carrier wave passes its peak value and drops below 10 volts transistor 36 cuts off and transistor 42 is turned on. When that occurs another spike or triggering pulse appears across resistor 70 and multivibrator 72 is again triggered to turn gate 74 on for another 14 microseconds to apply a second sample to the integrating circuit. Thus, on each positive-going half-cycle of the carrier wave the modulated wave is sampled twice.

That the sample values are not affected by the variations in the peak value $A_c$ of the carrier wave can readily be demonstrated analytically. Equation (1) above may be rewritten as:

(2) $Y = A_c A_m \sin w_m t \sin w_c t$

If the carrier reference value at the time the sample is to be taken is designated as $B$, then (3) $A_c \sin w_c t = B$ or (4) $w_c t = \sin^{-1}(B/A_c)$ Substituting equation (4) in equation (2) we can write (5) $Y = A_c A_M \sin w_m t \sin[\sin^{-1}(B/A_c)]$ or (6) $Y = BA_m \sin w_m t$ It will thus be readily apparent that the sample value of the carrier wave cannot be affected by variations in the peak value of the carrier since it includes no $A_c$ term.

It will be seen that I have accomplished the objects of my invention. I have provided a carrier-insensitive synchro detector which is not affected by variations in the peak value of the carrier wave. My detector overcomes the disadvantages of detectors employed in the prior art. It is relatively simple and inexpensive for the result achieved thereby.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A system for synchronously detecting an amplitude-modulated carrier signal including in combination, a source of reference carrier signal means including the reference source for providing an amplitude-modulated carrier signal, means for sampling the modulated carrier signal, a source of direct-current potential having a magnitude appreciably less than the peak amplitude of the reference carrier signal, means for comparing said direct-current potential with the instantaneous value of said reference carrier signal, and means responsive to said comparing means for enabling said sampling means at the instant at which the value of the reference carrier is equal to said direct-current potential for a period of time which is short relative to a half-cycle of the reference carrier.

2. A system as in claim 1 in which said comparing means comprises means for producing a sampling pulse when said reference carrier equals said predetermined voltage.

3. A system for detecting the envelope of an amplitude-modulated carrier signal including in combination, a source of an unmodulated reference carrier signal, means including said reference carrier signal source for producing said amplitude-modulated carrier, a source of direct-current reference potential having a magnitude less than said reference carrier signal peak value, means responsive to said reference carrier signal and to said reference potential for producing discrete sampling pulses at instants at which said reference carrier signal is equal to said reference potential, said sampling pulses being of a duration which is a minor fraction of a half-cycle of said reference carrier signal, signal-storing means, and means responsive to said sampling pulses for applying said modulated carrier signal to said storage means.

4. A system as in claim 2 in which said sampling means comprises a normally nonconductive device connected to said storage means, said device adapted to be rendered conductive in response to pulses applied thereto and means for applying said sampling pulses to said device.

5. A system as in claim 3 in which said storing means is an integrator.